S. H. MOORE.
Corn-Sheller.
No. 160,342.
Patented March 2, 1875.
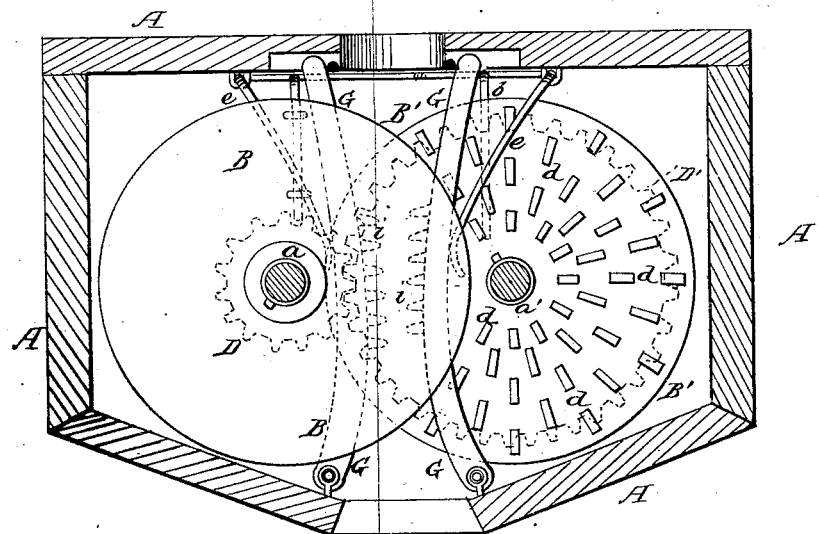
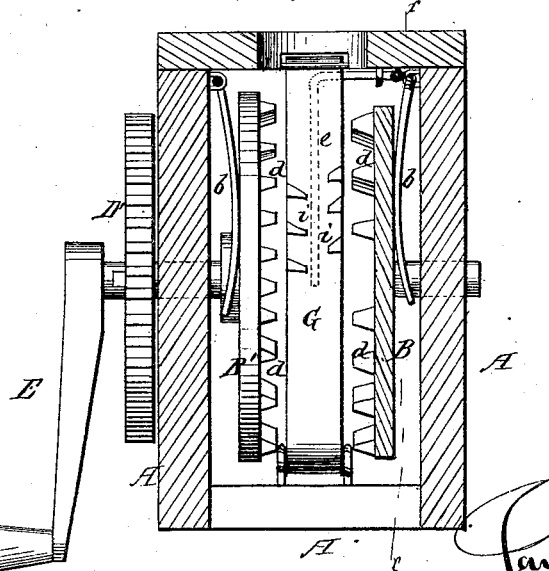

UNITED STATES PATENT OFFICE.

SAMUEL H. MOORE, OF CHICAGO, ILLINOIS.

IMPROVEMENT IN CORN-SHELLERS.

Specification forming part of Letters Patent No. 160,342, dated March 2, 1875; application filed February 16, 1875.

*To all whom it may concern:*

Be it known that I, SAMUEL H. MOORE, of Chicago, in the county of Cook and State of Illinois, have invented certain new and useful Improvements in Hand Corn-Shellers; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in the construction and arrangement of a hand corn-sheller, as will be hereinafter more fully set forth.

In the annexed drawing, Figure 1 represents a longitudinal section, and Fig. 2 a vertical section, of a device embodying my invention.

A represents a box of any suitable dimensions, to be fastened to a bench or table by means of a projecting arm or other device that will allow of leaving the bottom of the box free. In the box A are two parallel shafts, $a$ and $a'$, to which are attached the disks B and B', respectively. These shafts and disks are in such relative positions that the disk on one shaft will be close up to, but not touch, the other shaft, and the disks are a suitable distance apart, pressed inward by means of springs $b\ b$, of wire or other suitable material. Upon the inner faces of the disks B B' are formed teeth $d\ d$, arranged in a series of concentric circles, as shown. The shafts $a\ a'$ are geared together on the outside of the box by means of gear-wheels D D' of unequal diameter, and one of the shafts provided with a crank, E, for operating the sheller. It will thus be seen that the two disks are revolved in opposite directions and at unequal speed, which causes the corn to be easily and quickly removed from the cob, while the latter is fed downward between two curved and toothed arms or jaws, G G. These arms or jaws are hinged at the bottom of the box, pass upward between the disks B B', and are pressed inward by means of springs $e\ e$. They are on their inner faces provided with series of teeth $i\ i$, which are set at an angle, and upon the two jaws in opposite direction.

By means of the springs $b$ and $e$ the various parts of the shelling apparatus are allowed to give or yield, according to the size of the ear of corn passing through.

The ears of corn are fed through an opening in the top of the box, and the shelled corn, with the cobs, passes out through an opening in the bottom.

The machine is very simple in construction, cheap and durable, effective in operation, and not liable to get out of order.

Having thus fully described my invention, what I claim as new, and desire to secure by Letters Patent, is—

The combination, substantially as described, of the toothed disks B B', the hinged toothed arms or jaws G G, and the springs $b\ b$ and $e\ e$, for the purpose herein set forth.

In testimony that I claim the foregoing as my own I affix my signature in presence of two witnesses.

SAML. H. MOORE.

Witnesses:
 EDWD. J. MOORE,
 V. MUMFORD MOORE.